Patented May 1, 1934

1,957,415

UNITED STATES PATENT OFFICE 1,957,415

PRODUCTION OF CEMENT

Eugene J. Wechter, Speed, Ind., assignor to Louisville Cement Company, Louisville, Ky., a corporation of Kentucky No Drawing. Application May 12, 1932, Serial No. 610,997

4 Claims. (Cl. 106—27)

The present invention relates to the production of cement and has for its object the production of a cement having a slow set and improved plastic and water-repellant properties.

My cement possesses a special degree of plasticity which makes it easier to work and capable of having imparted thereto a better finish, and when set and dried the resulting cement-work resists moisture and is thus to a large extent immune from the effects of frost. These desirable results I obtain by a novel treatment of the cement with fatty acid in conjunction with a hydration treatment.

In the manufacture of natural cement, slow-setting properties have been imparted to the final product by mixing calcium oxid with the cement and stirring in the presence of enough water to hydrate the original and the derived calcium oxid. It has been proposed to add a previously-formed waterproofer to cement and also to add fatty acid to cement in processes essentially different from that herein set forth. I obtain a markedly superior product, possessing plastic and water-repellant properties not obtainable by processes hitherto known, by chemically forming the desired plasticity-imparting and/or water-repellant compound or compounds in situ uniformly throughout the cement in the process of manufacture in the novel manner hereinafter described and claimed. Further, I am able to obtain these improved results with the use of a lesser amount of fatty acid than is required when salts of fatty acids are separately formed and are then ground together with the cement or when fatty acid is used according to methods heretofore proposed. My invention is applicable to both natural and Portland cements.

By way of example of the present process, when treating natural cement I may proceed as follows: Assuming that it is desired to operate upon a batch of one ton weight, about 1620 lbs. of cement are mixed with about 200 lbs. of quick lime. These are ground to such fineness that about 85% of the mixture will pass a 100 mesh screen. The ground mixture is placed in a hydrator and water is added in quantity just sufficient to completely hydrate both the added calcium oxid and such calcium oxid as may be formed by the breakup of the aluminate in the mixture. Previous to hydration, fatty acids are added, preferably in amount less than 1% by weight of the mixture. I may add fatty acids of the $C_nH_{2n+1}COOH$, $C_nH_{2n-1}COOH$, $C_nH_{2n-3}COOH$ or $C_nH_{2n-5}COOH$ series, or mixtures thereof. I have obtained excellent results with mixtures of palmitic, stearic and oleic acids, although stearic or palmitic acid alone also gives very good results. In fact, any fatty acid or mixture of fatty acids may be used. The presence of small amounts of fatty acid of lower melting point tends to make possible a better diffusion of the acid. I have obtained excellent results by the use of mixed fatty acids obtained from garbage reduction. The fatty acids may conveniently be added at the same time that water for the hydration of the calcium oxid is added. The stirring in the hydrator is continued until the water all combines, whereupon the dry mass is removed from the hydrator and ground. It will be understood that the foregoing proportions are illustrative only and that they will vary with different samples of cement.

I attribute the high quality of the cement produced by my process to the following considerations among others:

By chemically forming salts of the fatty acids in situ in the cement instead of separately preparing such salts and then mechanically mixing them with the cement, I am able to effect a much more minute and uniform distribution of these compounds throughout the body of the cement.

The hydration of the lime generates considerable heat and increases the bulk of the lime. By adding fatty acid previous to this hydration, I take advantage both of the heat and of the physical "working" of the lime. The heat generates a certain amount of steam from the added water and since the fatty acids are partly steam volatile, they are by this means, as well as by the mechanical agitation and the chemically-induced agitation produced by the reaction between the lime and the water, thoroughly distributed throughout the body of the cement and carried to every particle of cement where a reaction takes place forming corresponding calcium (and in some cases magnesium) salts of the fatty acids.

At the temperature of hydration of natural cement in my process, the reaction between the fatty acids and cement is complete in less than three hours. The process of hydration not only generates steam carrying the fatty acids to every particle of the cement, but also generates a temperature favorable for the completion of the reaction.

My treatment with fatty acid is also applicable where there is no partial hydration of the cement. The water may be added in quantity just sufficient for the hydration of the free calcium oxid present.

When treating cements which naturally contain sufficient lime, it may be unnecessary to add lime before hydration.

As stated, I prefer to use less than 1% of fatty acids. More than 1% can be added, but there is a tendency to reduce the strength of the cement as the quantity of fatty acids is increased and at the same time the use of larger quantities of fatty acids adds materially to the cost of the cement.

The calcium content of the cement being more active than the magnesium content under hydration, the tendency is toward the formation of the calcium salts of the fatty acids. If, however, fatty acids are added in amount more than sufficient to combine with the calcium content, magnesium salts may be formed.

The partial hydration of the cement in my process, by breaking up the aluminates and hydrating the resulting calcium oxid, produces a slow-setting cement. The salts of fatty acids formed in the cement are plasticizers and water-repellants. By my method of chemically forming these salts in situ uniformly throughout the cement, I obtain a markedly superior product.

I claim:—

1. The process of treating cement which comprises adding calcium oxide to the cement and intimately mixing the same therewith, adding fatty acid in amount less than 1% by weight of the mixture, adding water in amount sufficient to hydrate both the original and the derived calcium oxide, stirring the mixture to expedite the reaction between the calcium oxide and the water, whereby the fatty acid is distributed throughout the cement and reacts therewith to form calcium salts of the said acid at the elevated temperature caused by the hydration of the calcium oxide.

2. The process of treating cement which comprises mixing together cement and quick lime in the proportions of approximately 8 to 1, grinding the mixture, adding fatty acid in amount less than 1% by weight of the mixture, adding water in amount sufficient to hydrate the added and the derived lime but insufficient to hydrate the silicates of the cement, stirring the mixture and reacting the water with the lime and the cement with the fatty acid.

3. The process of treating cement containing free calcium oxide which comprises adding fatty acid to such cement, adding water in amount sufficient to hydrate the free and the derived calcium oxide but insufficient to hydrate the silicates of the cement, hydrating the calcium oxide and simultaneously reacting the fatty acid with the cement at an elevated temperature resulting from the hydration of the calcium oxide, and forming a calcium salt of a fatty acid within and throughout the body of the cement.

4. The process of treating cement which contains free calcium oxide which comprises adding fatty acid to such cement in amount less than 1% by weight of the cement, adding water in amount sufficient to hydrate the calcium oxide but insufficient to hydrate the silicates of the cement, distributing the fatty acid throughout the mixture by mechanical stirring and by the reactive effect of the calcium oxide and water, and effecting reaction between the fatty acid and the calcium of the cement within and throughout the body of the cement.

EUGENE J. WECHTER.